(12) United States Patent
Nicholas

(10) Patent No.: US 8,079,785 B2
(45) Date of Patent: Dec. 20, 2011

(54) TOOL HOLDER ASSEMBLY

(75) Inventor: Roger Nicholas, Akron, OH (US)

(73) Assignee: Kennametal Inc., Latrobe, PA (US)

( * ) Notice: Subject to any disclaimer, the term of this patent is extended or adjusted under 35 U.S.C. 154(b) by 492 days.

(21) Appl. No.: 12/279,246

(22) PCT Filed: Feb. 28, 2007

(86) PCT No.: PCT/US2007/005383
§ 371 (c)(1),
(2), (4) Date: Aug. 13, 2008

(87) PCT Pub. No.: WO2007/100907
PCT Pub. Date: Sep. 7, 2007

(65) Prior Publication Data
US 2009/0016830 A1    Jan. 15, 2009

(51) Int. Cl.
*B23B 27/00* (2006.01)
*B23B 27/04* (2006.01)
(52) U.S. Cl. .................... 407/101; 407/109; 407/110
(58) Field of Classification Search ............. 407/101, 407/102, 103, 104, 105, 107, 109, 110
See application file for complete search history.

(56) References Cited

U.S. PATENT DOCUMENTS

| | | |
|---|---|---|
| 2,101,158 A | 12/1937 | Redinger |
| 2,375,916 A | 5/1945 | Grigalauski |
| D270,059 S | 8/1983 | Wilkins |
| D271,497 S | 11/1983 | Green |
| D311,747 S | 10/1990 | Mihic |
| 4,992,007 A | 2/1991 | Satran |
| 5,112,164 A | 5/1992 | Pano |
| 5,159,963 A | 11/1992 | Paajanen |
| 5,161,920 A | 11/1992 | Zinner |

(Continued)

FOREIGN PATENT DOCUMENTS

WO    WO 2004 035257 A2    4/2004

OTHER PUBLICATIONS

International Search Report PCT/US07/05383.

*Primary Examiner* — Will Fridie, Jr.
(74) *Attorney, Agent, or Firm* — Larry R. Meenan

(57) ABSTRACT

A tool holder assembly that includes a tool holder member adapted to be secured to a machine tool and a cutting insert support/clamp for clamping and supporting a cutting insert. The support/clamp member includes a plurality of serrations that are engageable with complementally formed serrations on the tool holder whereby a tight fitting engagement is achieved using removable fasteners. The support/clamp includes a clamping arm elastically movable towards and away from a support base and a clamping block connected to the connecting arm adapted to receive clamping forces from a threaded clamping bolt. The clamping bolt defines a force applying surface located in a first plane whereas the clamping block defines a force receiving surface located in a second plane, the first and second planes located at a diverging angle with respect to each other. The clamping block includes an edge portion engageable with a step on the tool holder that is spaced from the clamping arm. The diverging planes and the engagement of the clamping block with the stepped portion increases the force applied by the clamping arm to the cutting insert for a given adjustment of the clamping bolt and resists rollover of the insert.

12 Claims, 4 Drawing Sheets

U.S. PATENT DOCUMENTS

| | | | |
|---|---|---|---|
| 5,360,298 A | 11/1994 | Hedlund | |
| D370,019 S | 5/1996 | Stewart | |
| 5,743,680 A | 4/1998 | Von Haas et al. | |
| 5,810,518 A | 9/1998 | Wiman et al. | |
| 5,833,403 A * | 11/1998 | Barazani | 407/101 |
| 6,086,291 A | 7/2000 | Hansson et al. | |
| 6,186,704 B1 * | 2/2001 | Hale | 407/101 |
| 6,270,294 B1 | 8/2001 | Sjoo et al. | |
| 6,872,033 B2 | 3/2005 | Rydberg | |
| 6,960,049 B2 | 11/2005 | Inayama | |
| 6,974,283 B2 | 12/2005 | Oettle | |
| 7,001,114 B2 | 2/2006 | Blucher et al. | |
| 7,011,476 B1 | 3/2006 | King et al. | |
| 7,013,773 B2 | 3/2006 | Hansson | |
| 7,104,171 B1 | 9/2006 | Long | |
| 7,156,588 B2 | 1/2007 | Elbaz et al. | |
| 7,182,556 B2 | 2/2007 | Takiguchi et al. | |
| 7,641,423 B2 * | 1/2010 | Blucher et al. | 407/66 |
| 7,758,286 B2 * | 7/2010 | Nagaya et al. | 407/101 |
| 7,780,380 B2 * | 8/2010 | Nagaya et al. | 407/101 |
| 2004/0101371 A1 | 5/2004 | Avidsson et al. | |
| 2005/0129471 A1 | 6/2005 | Englund | |
| 2005/0152754 A1 | 7/2005 | Wiman et al. | |
| 2007/0110526 A1 | 5/2007 | Nicholas | |

* cited by examiner

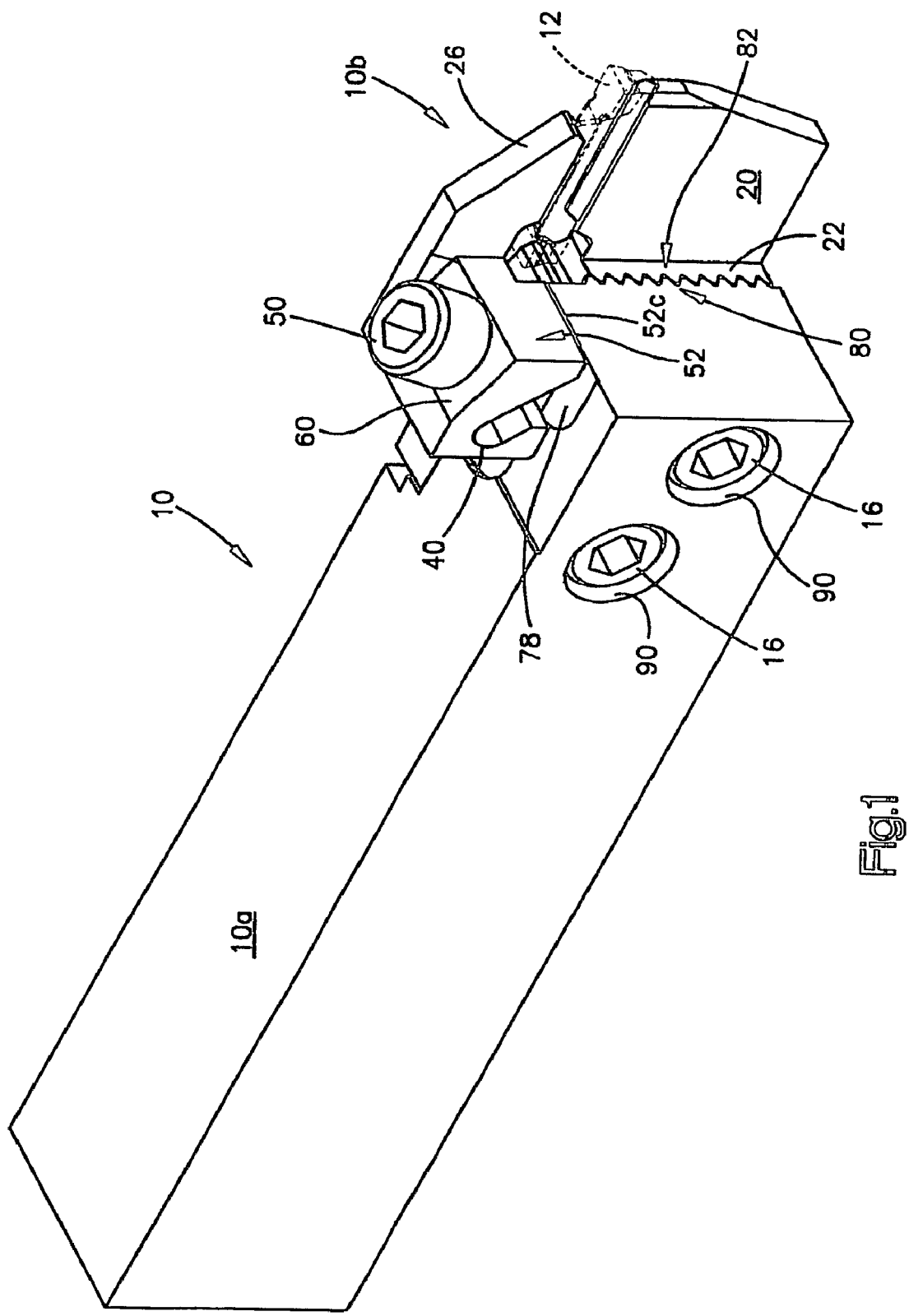

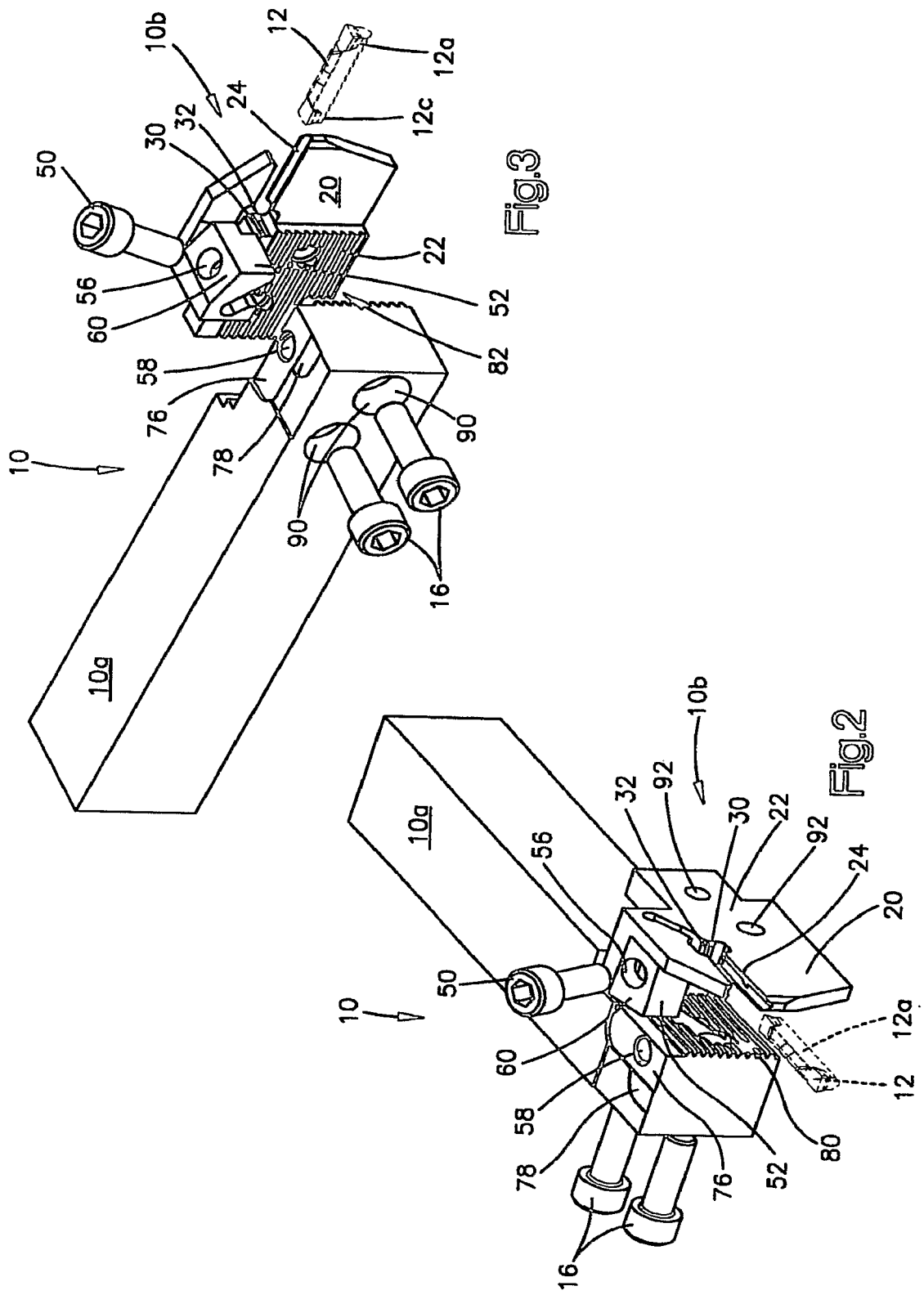

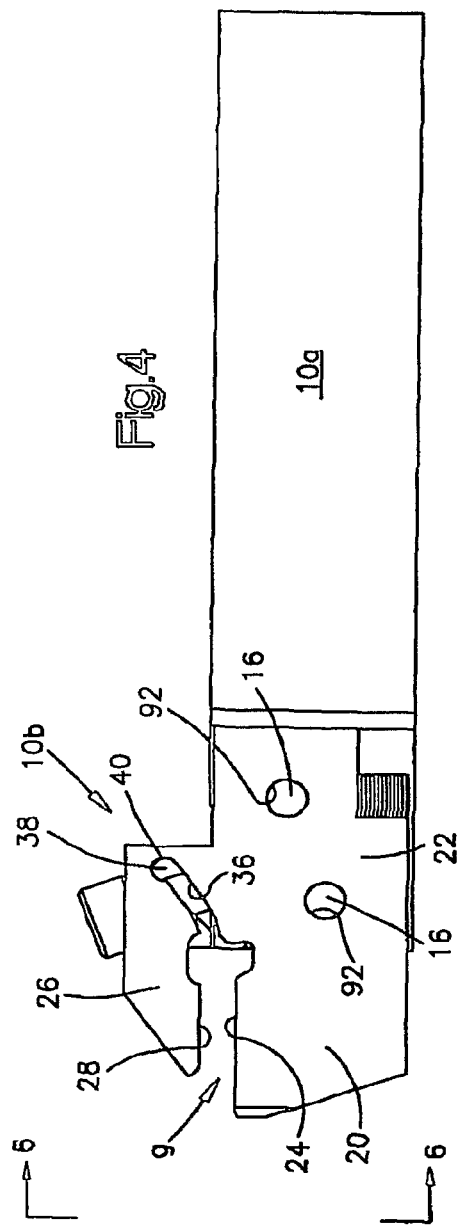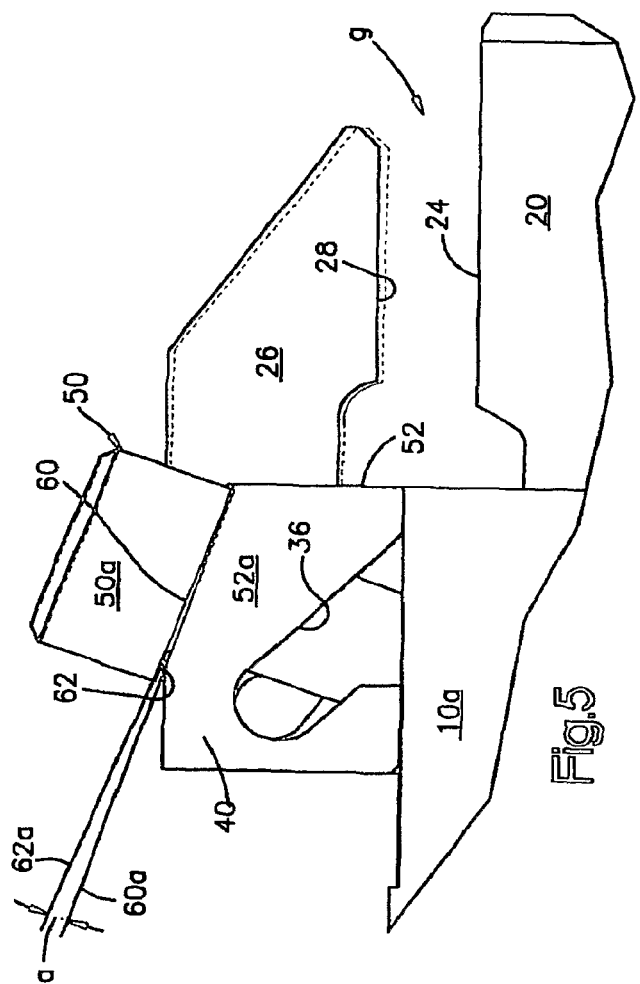

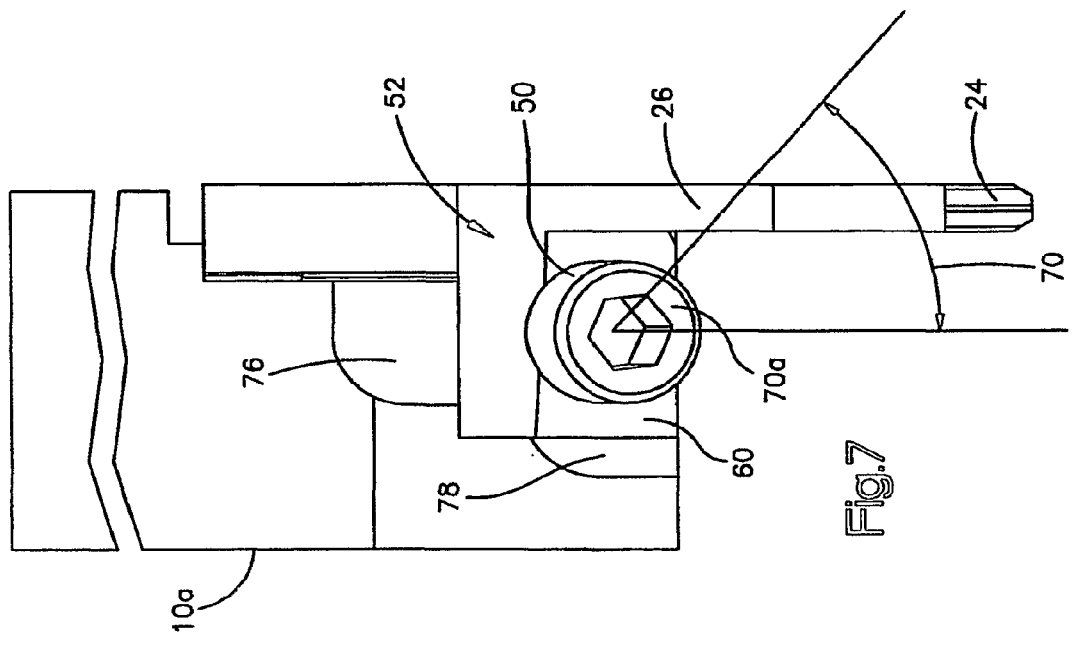
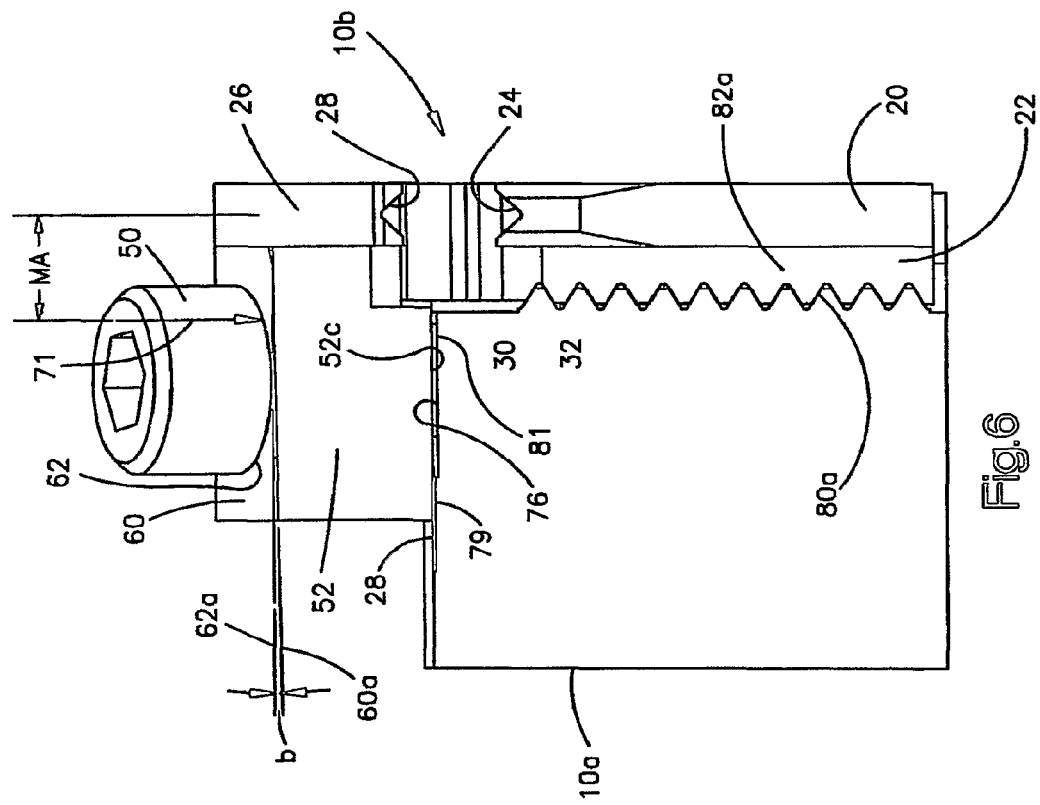

TOOL HOLDER ASSEMBLY

TECHNICAL FIELD

The present invention relates generally to metal cutting apparatus and methods, and in particular to a tool holder assembly for supporting and clamping a cutting insert in a machining position within a machine tool.

BACKGROUND ART

Cutoff and grooving systems with replaceable components are known in the art and are used on lathes and other turning equipment. The use of replaceable components reduces the overall cost of a grooving or cutoff system by allowing replacement of less costly support and clamping members rather than the replacement of the entire tool holder. Some existing systems allow the separate replacement of the support member or the clamping member. Other systems combine these two components into one member for inventory simplification.

Generally speaking, these existing systems although more economical, suffer loss of performance as compared to their integral shank equivalents because each component must be separately fastened and mated to the tool holder and in a way that optimally supports and clamps the cutting insert. This is particularly true of smaller shank height systems where the ability to support components effectively is greatly reduced as overall tool holder height shrinks.

One existing method of mating the replaceable component to the tool holder is by the use of serrations on the two abutting faces of the tool holder and component respectively. This method has proven to be satisfactory when used in conjunction with internal machining tool holders having a "replaceable head". It has also proven useful for tool holders with proprietary shank configurations that feature a variety of different "heads" which perform a multiplicity of metal removal functions. Existing component style cutoff and grooving systems featuring serrated mating surfaces are adaptations of the above described internal machining tool holders and are bulky and difficult to use on machine tools with turrets that accommodate smaller shank height tooling. They also require a cylindrical center member for the purpose of component location which adds cost and complexity to the system.

DISCLOSURE OF THE INVENTION

The present invention provides a new improved tool holder assembly capable of supporting and clamping a cutting insert in an operative, machining position with respect to a rotating workpiece.

It is an object of the present invention to provide a component style cutting insert support/clamping system that performs as closely as possible to an integral system while still realizing the cost benefits of a component type of system.

According to the invention, a support/clamp for clamping and supporting a cutting insert in an operative position within the machine tool is disclosed. The support/clamp includes a clamping arm elastically movable towards and away from a support base. A structure for receiving clamping forces is connected to the clamping arm and is adapted to receive clamping forces applied by a threaded clamping member.

According to one feature, the clamping member defines a force applying surface located in a first plane. The clamping force receiving structure defines a force receiving surface located in a second plane. The second plane is preferably located at a diverging angle with respect to the first plane such that only a portion of the force applying surface of the clamping member initially engages the force receiving surface. With this configuration, a moment arm is defined between a force vector applied by the clamping member to the clamping force receiving structure and the clamping arm that is shorter than a distance between the clamping arm and an axis of a clamping member. With this configuration, the force exerted by the clamping arm on a cutting insert held by the support/clamp is increased.

According to another feature of the invention, the clamping force receiving structure includes a region engageable by an abutment that is spaced from the clamping arm. With this configuration, the force exerted by the clamping arm on a cutting insert held by the support/clamp member is increased for a given adjustment of the clamping member.

A simpler system which uses serrated mating surfaces in a stepped arrangement without the use of the cylindrical member is less costly and delivers superior support compared to existing systems because of the increased contact area between the tool holder and mating component along the serrated surfaces. The stepped arrangement also permits this design to work more effectively on small shank holders by allowing for a large contact area where the tool holder and components mate. The disclosed system also preferentially directs the clamping forces in order to reduce excessive rollover moments which can occur during the clamping of the insert.

This invention proposes to resolve these issues by several means. The disclosed cutting insert support/clamp offers support and clamping to a grooving or cutoff insert. The insert support/clamp features a step in the section height of the support section that maximizes the area of the serrated mating surfaces. Fastening holes are similarly stepped to maintain component strength and integrity. The reduced section height portion of the component is equal to the height of the smallest tool holder system in which it is likely to be mounted.

Careful direction of clamping forces is achieved by a combination of features. One is the configuration of clamp force receiving surface of the insert holder. It is angled in two directions with respect to the force applying surface of the clamping bolt. With the disclosed angularity, the clamping bolt preferentially contacts a region on the clamping surface that is closer to the clamping jaw. This results in the clamping forces being directed in a controlled fashion such as along the center of mass of the insert holder.

The primary objective of the angular planarities between the clamping surface and the clamping bolt force applying surface is to insure that it moves the section of the clamping member or jaw that engages the insert in one plane only. With clamping forces directed as such, clamping action will be such that the body of the clamping section does not tend to roll over but will exert a substantially vertical force on the cutting insert. Secondly, the clamping section will utilize a wider section than is currently found in existing art tools that will oppose the roll over moment typically encountered in cutoff and grooving applications. The clamping area employs an exterior, locating pad to prevent rollover of the clamping section during the fastener tightening process. This insures that no additional force components are introduced which could add to the rollover of the entire component. Finally, a second clamping zone pad is employed that is in contact with the toot holder during the final stages of clamp tightening. This further insures that rollover of the clamping area is prevented throughout the entire clamping process.

Additional features of the invention and a fuller understanding of the invention will be obtained by reading the following detailed description made in connection with the accompanying drawings.

BRIEF DESCRIPTION OF DRAWINGS

FIG. 1 is a perspective view of a tool support assembly constructed in accordance with the preferred embodiment of the invention;

FIG. 2 is an exploded view of the tool support assembly shown in FIG. 1;

FIG. 3 is another exploded view of the tool support assembly rotated 90 degrees from the position shown in FIG. 2;

FIG. 4 is a side elevational view of the tool support assembly;

FIG. 5 is a fragmentary, side elevational view of the tool support assembly;

FIG. 6 is an end view of the tool support assembly as seen from the plane indicated by the line 6-6 in FIG. 4 and, FIG. 7 is a top plan view of the tool support assembly.

DETAILED DESCRIPTION

FIG. 1 illustrates the overall construction of a tool holder assembly 10 constructed in accordance with a preferred embodiment of the invention. The tool holder assembly 10 is used to support a cutting insert 12 in a machining position with respect to a workpiece (not shown). The tool holder assembly includes a bar-like tool holder 10a which is suitably mounted or attached to a machine tool. Typically, the tool holder 10a is secured to a "pocket" of a turret that forms part of the machine tool. This enables the tool holder assembly 10 and hence the associated cutting insert 12 to be moved to various positions in order to perform cutting operations on a rotating workpiece such as bar or tube stock (not shown).

In accordance with the invention, a cutting insert support/clamp indicated generally by the reference character 10b is removably secured to the tool holder 10a by a pair of socket bolts 16. Referring also to FIGS. 2 and 3, the insert support/clamp 10b is of the blade type and includes a laterally extending blade-like base 20 which extends laterally from a mounting portion 22 of the support/clamp 10b. In the preferred embodiment, the base blade 20 defines a V-shaped groove 24 which is adapted to receive a V-shaped surface 12a defined on a bottom of the cutting insert 12.

The insert support/clamp 10b also defines an elastically movable upper jaw or clamping arm 26 that is located in an aligned, confronting position with respect to the support base 20. A gap g (shown best in FIG. 4) is defined between the upper jaw 26 and the support blade 20 which is sized and configured to receive the cutting insert 12. Preferably, the upper jaw includes a clamping surface in the form of an inverted V-shaped recess 28 adapted to complementally engage an inverted V-shaped surface defined on an upper portion 12b of the cutting insert 12. It should be noted here, that the support blade 20 and the clamping jaw 26 may have either a V-shaped surface or an inverted V-shape recess and the cutting insert would include a complementally formed V-shaped recess or inverted V-shaped surface depending on the configuration of the clamping surface 28 on the jaw 26. U.S. Design Pat. No. D502,473 illustrates a cutting insert having surfaces configured to be clamped by the support blade clamping surface 24 and the jaw clamping surface 28 and is hereby incorporated by reference.

In the illustrated embodiment, the cutting insert support/clamp 10b also defines contiguous, planar abutment surfaces 30, 32 one of which is engageable by an end surface 12c defined by the cutting insert 12. The configuration of these planar surfaces 30, 32 and the engagement of these surfaces by cutting inserts are more fully described in International Publication No. WO 2004/0352557 A2, published Apr. 29, 2004 which is hereby incorporated by reference. The illustrated abutment surfaces 30, 32 and the means by which engagement is achieved between these surfaces and the cutting insert 12 do not form part of the present invention.

Referring also to FIG. 4, the support blade 20 and clamping arm or jaw 26 are integrally formed from a single piece of material. As seen best in FIG. 4, a slot 36 is defined in the insert support/clamp 10b that opens on one end into the gap g and terminates at a hole 38. This construction defines an elastic hinge-like region 40 that interconnects the clamping jaw 26 to the mounting portion 22 of the insert support/clamp 10b. The disclosed construction enables the clamping arm 26 to elastically move towards and away from the base blade 20.

Clamping forces are applied to a cutting insert 12 located in the gap by a threaded fastener 50 which may be a socket head bolt that extends through a force receiving block-like element 52 integrally formed in the insert support/clamp 10b. As seen best in FIG. 6, the block 52 is located adjacent the upper clamping arm or jaw 26 and also partially defines the slot 36. A segment of the block 52 above the slot 36 and indicated by the reference character 52a is integrally formed and moves with the upper clamping arm 26. The threaded clamping fastener 50 which, for purposes of explanation, may be referred to as a clamping bolt extends through a hole 56 formed in the block 52 and is threadedly received by a threaded bore 58 (shown best in FIGS. 2 and 3) defined in the tool holder 10a. As seen best in FIG. 5, as the clamping bolt 50 is drawn down, it contacts an inclined clamping surface 60. Further rotation of the clamping bolt 50 urges the clamping block 52 downwardly and since it is integrally formed with the upper clamping arm 26 it produces concurrent downward movement in the clamping arm. When a cutting insert 12 is mounted in the gap g, the clamping force exerted on the clamping block 52 by the clamping bolt 50 is transferred to the clamping arm 26 and results in a clamping force being exerted on the cutting insert 12 thus clamping the insert between the upper jaw 26 and base 20. In accordance with a feature of the invention, a plane 60a of the block clamping surface 60 is slightly angled in two directions with respect a plane 50a in which a lower surface 62 of the clamping bolt 50 is located in. In other words, the underside surface 62 of the clamping bolt 50 is not parallel to the clamping surface 60 of the clamping block 52. The angularity between these surfaces 60, 62 is indicated by the angle "a" in FIG. 5 and angle "b" in FIG. 6.

In the preferred embodiment the angles are preferably in the range of 2 degrees. With this construction, the clamping force exerted by the head 50a of the clamping bolt 50 is first exerted in the region of the clamping surface that is offset from the centerline of the clamping bolt 50.

Referring to FIGS. 6 and 7, the segment or portion 70a of the bottom surface 62 of the clamping bolt 50 that initially contacts the angled clamping surface 60 is indicated by the arc 70 shown in FIG. 7. In the preferred embodiment, this arc is approximately 50°. As the clamping bolt 50 is tightened, a segment of the bottom surface 62 of the bolt head 50a as indicated by the arc 70 first contacts the clamping surface 60 and exerts a clamping force that is offset from the centerline from the clamping bolt 50. The locus of the force being applied by the clamping bolt 50 is indicated by the force arrow 71 in FIG. 6. The force vector 71 defines a moment arm "MA" between itself and a center-plane of the upper jaws/ clamping arm 26. It will be noted, that this moment arm MA is shorter than the moment arm that would exist if the clamping surface 60 was parallel to the underside 62 of the clamping bolt 50, i.e., the moment arm would extend between a centerline of the clamping bolt 50 and the center-plane of the clamping arm 26. The reduction in this moment arm MA reduces the tendency for longitudinal twisting or "roll over" of the cutting insert 12 within the insert support/clamp 10*b*.

According to a further aspect of this feature, the tool holder 10*a* includes a stepped surface that further reduces the tendency of "roll over". Referring in particular to FIGS. 2, 3, 6, and 7, the tool holder 10*a* defines a first, recessed surface 76 and an adjacent, raised step surface 78. Referring in particular to FIG. 7, as the clamping block 52 is moved downwardly by the clamping bolt 50 as it is drawn down, a portion of a bottom edge 52*c* abuttably engages the raised step surface 78. The region of contact between the stepped surface 78 and the bottom edge 52*c* of the clamping block 52 is indicated by the reference character 79. As seen in FIG. 6, this results in a gap 81 between other portions of the bottom edge 52*c* and the recessed surface 76. Further tightening of the clamping bolt 50 after the initial contact between the stepped surface 78 and the bottom edge portion 79, further aids in shifting the locus of the force being applied by the clamping bolt 50 so that it is closer to the clamping arm 26. This shifting of the force locus further reduces the occurrence of twisting or "roll over" of the insert held between the support base 20 and the clamping arm 26. The disclosed construction shifts the clamping force exerted by the clamping bolt 50 rightwardly (as viewed in FIG. 5) and rightwardly as viewed in FIG. 6 with respect to the axis of the clamping bolt 50 It is believed that shifting the force vector as detailed above reduces the length of the moment arm MA and results in the reduction of longitudinal twisting or "rollover" of the cutting insert 12 within the insert support/clamp 10*b*.

Referring once again to FIGS. 2 and 3, another feature of the invention is illustrated. In accordance with this feature, the cutting insert support/clamp 10*b* is replaceable independent of the tool holder 10*a*. In many prior art constructions, the tool holder is of a unitary construction. Should damage occur the portion of the holder that mounts the cutting insert, the entire tool holder must be replaced. In the illustrated embodiment, only the damaged portion need be replaced.

To achieve this feature, a plurality of serrations or ribs/grooves indicated generally by the reference character 80 in FIG. 2 are formed on a side surface of the tool holder 10*a*. A plurality of complementally formed serrations or ribs/grooves indicted generally by the reference character 82 in FIG. 3 are formed on a side surface of the mounting portion 22 of the cutting insert support/clamp 10*b*. The individual surface elements that make up the serrations 80, 82 as well as their engagement are shown best in FIG. 6 and are indicated by the reference characters 80*a*, 82*a*.

The serrations 80, 82 are configured to inter-engage each other in a tight fitting relationship so that when the mounting bolts 16 are secured, the cutting insert holder 10*b* is rigidly secured to the tool support 10*a*. In the illustrated embodiment, the securing bolts 16 extend through holes 90 formed in the tool holder support 10*a* and threaded engage threaded bores 92 formed in the insert support/clamp 10*b* (see FIGS. 2 and 3). It should be noted here that the serrations 80, 82 on the tool holder 10*a* and cutting insert support/clamp 10*b* may be replaced by other structures such as ridge, parallel grooves and flutes, etc. that are co-engageable to define a tight fitting relationship between the tool holder 10*a* and cutting insert support/clamp 10*b*.

It should be noted that the present invention is adaptable other types of tool holder configurations and insert support/clamps. For example, cylindrical tool holders are contemplated by the present invention. Insert support/clamps with a curved jaw and/or curved base blade which sweep inwardly or outwardly may also utilize the present invention.

Although the invention has been described with a certain degree of particularity, it should be understood that those skilled in the art can make various changes to it without departing from the spirit or scope of the invention as hereinafter claimed.

I claim:

1. A tool holder assembly, comprising:
   a tool holder member adapted to be secured to a machine tool;
   a cutting insert support/clamp for clamping and supporting a cutting insert in an operative position within said machine tool, the cutting insert having a longitudinal axis;
   said support/clamp member removably secured to said tool holder member;
   said cutting insert support/clamp including a clamping arm elastically movable towards and away from a support base, the clamping arm having a longitudinal axis substantially parallel to the longitudinal axis of said cutting insert;
   a clamping block connected to said clamping arm and adapted to receive clamping forces from a threaded clamping member;
   said clamping member defining a force applying surface located in a first plane;
   said clamping block defining a force receiving surface located in second plane, said second plane located at a diverging angle with respect to said first plane such that only a portion of said force applying surface of said clamping member initially engages said force receiving surface on said clamping block whereby a moment arm is defined between a force vector applied by said clamping member to said clamping block and said clamping arm that is shorter than a distance between said clamping arm and an axis of said clamping member.

2. The tool holder assembly of claim 1 wherein said clamping member is threadingly received by the tool holder.

3. The tool holder assembly of claim 1 wherein said tool holder includes a stepped surface wherein said stepped surface is engageable by a portion of a edge of said clamping block such that a gap is defined between another portion of said clamping block edge and a recess surface defined by said tool holder.

4. The tool holder assembly of claim 1 wherein said insert support/clamp includes tool holder engagement structure that is engageable with complementary formed structure on said tool holder whereby a tight fitting engagement is achieved between said tool holder and said insert support/clamp.

5. The tool holder assembly of claim 4 wherein said engagement structure is a plurality of serrations.

6. A support/clamp member for clamping and supporting a cutting insert in an operative position within a machine tool, comprising:
   a clamping arm elastically movable towards and away from a support base, the clamping arm having a longitudinal axis substantially parallel to a longitudinal axis of said cutting insert;
   structure connected to said clamping arm for receiving clamping forces from an adjustable clamping member;
   said clamping member defining a force applying surface located in a first plane;

said force receiving structure defining a force receiving surface located in a second plane, said second plane located at a diverging angle with respect to said first plane such that only a portion of said force applying surface of said clamping member initially engages said force receiving surface on said structure whereby rollover of an insert held by said support/clamp is resisted.

7. The support/clamp member of claim 6 further including a region on said force receiving structure engageable with an abutment spaced from said clamping arm whereby forces applied by said clamping member to an insert held by said support/clamp are increased.

8. The apparatus of claim 7 wherein said abutment forms part of a tool holder member to which said support/clamp is secured.

9. A tool holder assembly, comprising:
   a tool holder member adapted to be secured to a machine tool;
   a cutting insert support/clamp for clamping and supporting a cutting insert in an operative position within said machine tool, the cutting insert having a longitudinal axis;
   said cutting insert support/clamp including a clamping arm elastically movable towards and away from a support base, the clamping arm having a longitudinal axis substantially parallel to the longitudinal axis of said cutting insert;
   a clamping force receiving structure connected to said clamping arm and adapted to receive clamping forces from an adjustable clamping member;
   said clamping member defining a force applying surface for applying clamping forces to said structure whereby said clamping arm is moved into clamping engagement with a cutting insert held between said clamping arm and said support base;
   said structure defining a region engageable with an abutment forming part of said tool holder assembly that is spaced from said clamping arm such that clamping forces exerted by said clamping member on said cutting insert are increased.

10. The apparatus of claim 9 wherein said force applying surface defined by said clamping member is located in a first plane and said force receiving structure defines a force receiving surface located in a second plane, said second plane located at a diverging angle with respect to said first plane.

11. The apparatus of claim 9 wherein said abutment forms part of said tool holder member.

12. A tool holder assembly, comprising:
   a tool holder member adapted to be secured to a machine tool;
   a cutting insert support/clamp for clamping and supporting a cutting insert in an operative position within said machine tool, the cutting insert having a longitudinal axis;
   said support/clamp member removably secured to said tool holder member, said support/clamp member including a plurality of serrations that are engageable with complimentarily formed serrations on said tool holder whereby a tight fitting engagement is achieved between said tool holder and said insert support/clamp;
   said cutting insert support/clamp including a clamping arm elastically movable towards and away from a support base, the clamping arm having a longitudinal axis substantially parallel to the longitudinal axis of said cutting insert;
   a clamping block connected to said clamping arm and adapted to receive clamping forces from a threaded clamping bolt;
   said clamping bolt defining a force applying surface located in a first plane;
   said clamping block defining a force receiving surface located in a second plane, said second plane located at a diverging angle with respect to said first plane;
   said clamping block including an edge portion engageable with a step portion on said tool holder that is spaced from said clamping arm.

\* \* \* \* \*